US012788032B2

(12) United States Patent
Vanacker et al.

(10) Patent No.: US 12,788,032 B2
(45) Date of Patent: Nov. 10, 2026

(54) DRIED ANIMAL DIGEST COMPOSITIONS

(71) Applicant: Société des Produits Nestlé S.A., Vevey (CH)

(72) Inventors: Pascal Vanacker, Amiens (FR); Benjamin Jean Didier Le Reverend, Kirkwood, MO (US); Annie Elisabeth Watelain, Lavieville (FR); Geoffrey Buneaux, Campigny (FR); Jerome Briffaut, Denain (FR)

(73) Assignee: SOCIÉTÉ DES PRODUITS NESTLÉ S.A., Vevey (CH)

( * ) Notice: Subject to any disclaimer, the term of this patent is extended or adjusted under 35 U.S.C. 154(b) by 367 days.

(21) Appl. No.: 18/506,326

(22) Filed: Nov. 10, 2023

(65) Prior Publication Data

US 2024/0156130 A1 May 16, 2024

Related U.S. Application Data

(60) Provisional application No. 63/425,414, filed on Nov. 15, 2022.

(51) Int. Cl.
*A23K 40/10* (2016.01)
*A23K 10/20* (2016.01)
*A23K 10/30* (2016.01)

(52) U.S. Cl.
CPC .............. *A23K 40/10* (2016.05); *A23K 10/20* (2016.05); *A23K 10/30* (2016.05)

(58) Field of Classification Search
CPC ......... A23K 10/20; A23K 10/30; A23K 40/10
See application file for complete search history.

(56) References Cited

U.S. PATENT DOCUMENTS

2012/0213889 A1 8/2012 Chiang
2014/0242215 A1* 8/2014 De Ratuld ............. A23K 10/22 426/641

OTHER PUBLICATIONS

Bhaskar et al., "Evaluation of Poultry Viscera as Potential Fish Feed Ingredient, Compared To Fishmeal", International Journal of Current Research, vol. 06, Issue No. 02, Jan. 1, 2014, pp. 5241-5243, XP093131651.
International Search Report and Written Opinion to PCT/IB2023/061393 dated Feb. 15, 2024.
Schuck, Spray drying of dairy products: state of the art. Lait, 82, (2002) pp. 375-382.
Anandharamakrishnan et al., Introduction to Spray drying, Spray Drying Techniques for Food Ingredient Encapsulation, 2015, pp. 1-36.
Bete, Bete Spray Dry manual. 2005. 25 pages. https://www.bete.com/pdfs/BETE_SprayDryManual.pdf.

(Continued)

*Primary Examiner* — Stephanie A Kohler

(57) ABSTRACT

A dried animal digest composition can include dried animal digest particles having an animal fat content of about 16 wt % or less and a moisture content of about 3 wt % or less. The dried animal digest particles in this example have a volume diameter particle size distribution where D10 is from about 20 µm to about 50 µm, D50 is from about 60 µm to about 150 µm, and D90 is from about 160 µm to about 275 µm. Furthermore, the dried animal digest composition is substantially devoid of silicon dioxide flow aid.

10 Claims, 3 Drawing Sheets

(56) References Cited

OTHER PUBLICATIONS

Fitzpatrick et al, Effect of powder properties and storage conditions on the flowability of milk powders with different fat contents. Journal of Food Engineering, 2004, pp. 435-444.
Vignolles M.L., Jeantet R., Lopez C., Schuck P., 2007. Free fat, surface fat and dairy powders: interactions between process and product. A review. Le Lait., 87 (3), 187-236.
Westergaar, Milk powder technology—Evaporation and spray drying. GEA Process Engineering, 2010, pp. 1-338.

* cited by examiner

DRIED ANIMAL DIGEST COMPOSITIONS

CROSS REFERENCE TO RELATED APPLICATIONS

This application claims priority to U.S. Provisional Application Ser. No. 63/425,414 filed Nov. 15, 2022, the disclosure of which is incorporated in its entirety herein by this reference.

BACKGROUND

Animal digest is often used as a flavoring for animal feed, such as for domestic pet food for companion animals, e.g., canines or dogs, felines or cats, hamsters, etc. Liquid animal digest (LAD) can be produced by chemical and/or enzymatic hydrolysis of animal tissue, e.g., hydrolyzed meat and/or fat from chicken, pork, beef, lamb, etc., which results in shorter chain proteins and peptides and/or shorter fat chains of the raw animal tissue. In preparation, animal tissue may be exposed to heat, physical shearing, acids, alkali compounds, and/or enzymes, which assist with breaking down proteins and/or fats that may be present in the raw animal tissue. In some instances, liquid animal digest can be dried to form dried animal digest (DAD) particles using any of a number of drying technologies. Regardless of whether liquid animal digest or dried animal digest is used, the object is typically the enhancement of the palatability and/or nutrition of the pet food by incorporating the animal digest therewith.

DETAILED DESCRIPTION

Figure 1:
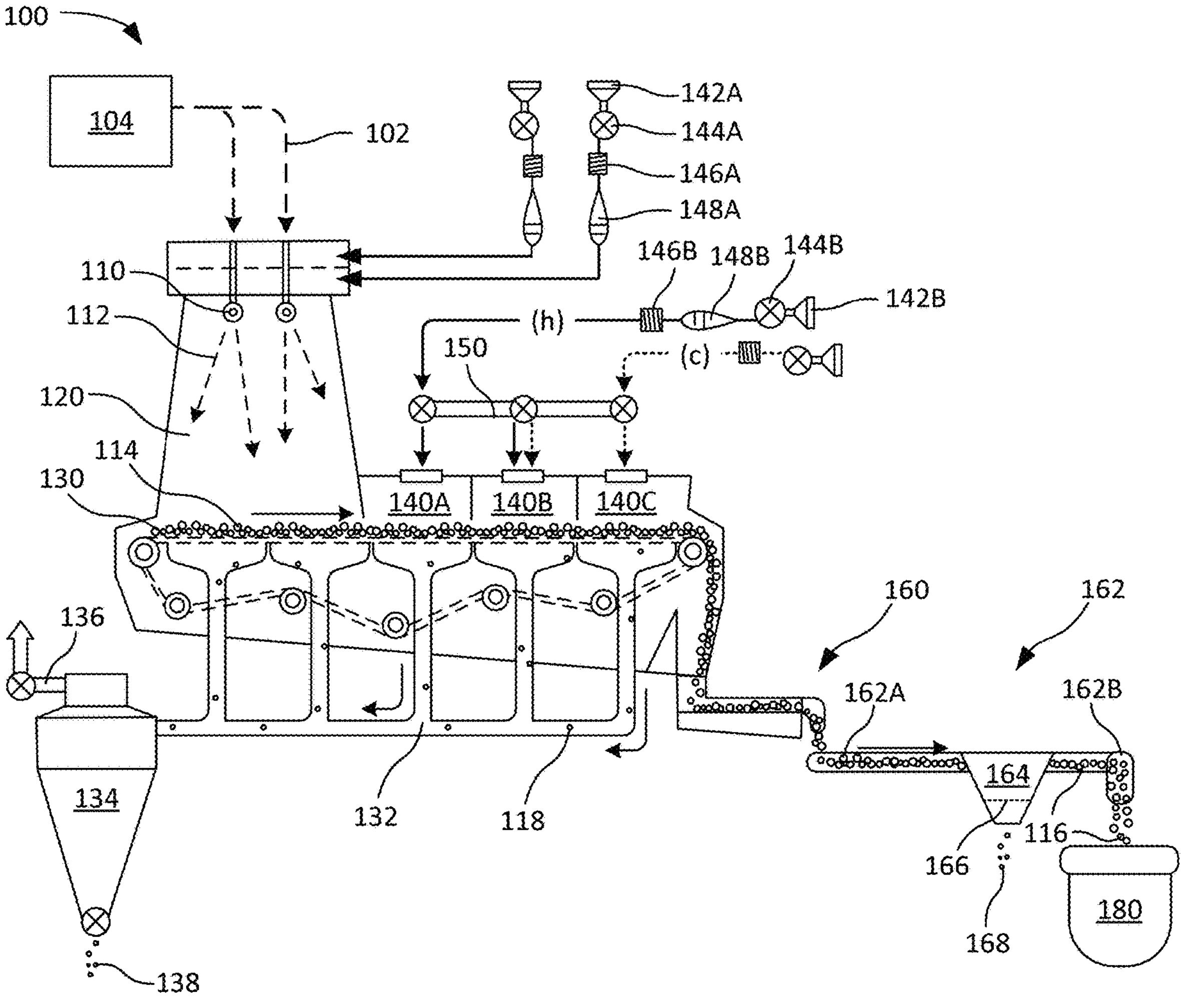
FIG. 1 depicts an example belt spray dryer usable in preparing dried animal digest particles in accordance with the present disclosure.

Dried animal digest compositions of the present disclosure can be prepared by drying liquid animal digest that includes hydrolyzed animal tissue admixed with other compounds, e.g., antioxidants, flavoring compounds, nutritional additives, preservatives, etc. The process of making liquid animal digest can include multiple steps, including a digestion process where the animal tissues are hydrolyzed, followed by a thermal reaction process where a Maillard reaction may be carried out. In these processes, the raw animal tissue, such as meat and/or fat from chicken, pork, beef, lamb, etc., is hydrolyzed resulting in shorter chain proteins and/or peptides than that which is inherently predominant in the raw animal tissue. The breaking down of the raw animal tissue to shorter hydrolyzed proteins and peptides and/or shorter chain fats from its raw protein and content may occur by exposing the raw animal tissue to heat, physical shearing, acids, and/or enzymes, for example. Prior to breakdown of the proteins and/or fats, the raw animal tissue may include highly concentrated proteins. In some examples, enzymatic hydrolysis and heat can be used together as an effective way of hydrolyzing the proteins and/or fats, resulting in the presence of hydrolysates that provide acceptable digests for use in providing animals with good nutrition and/or palatability.

The liquid animal digests can be used to prepare the dried animal digest compositions of the present disclosure using a gentle two-stage drying process, for example. In some examples, the two-stage drying process can be carried out using a belt spray dryer. An example belt spray dryer that can be used is known in the industry as a FILTERMAT® spray dryer from GEA (Denmark), though there are other belt spray dryers that could likewise be used. There may be some advantages of using the gentle drying process provided by a belt spray dryer, including its effectiveness in the drying of products that may be more heat sensitive, as the drying temperatures and resistance times for drying at each of the stages can be more precisely controlled, e.g., air temperatures in different zones can be independently controlled so that particle properties can be engineered. Belt spray dryers also work well with sticky products that may be hygroscopic and/or have a high content of short carbohydrates.

However, when using a belt spray dryer, the retention of very small particles that may be sticky can lead to flow problems, even when significantly dried, e.g., from about 0.5 wt % to about 3 wt % moisture content. For example, a belt spray dryer typically includes a pneumatic outlet where the dried product is pneumatically pumped (sometimes after grinding) for collection in a receptacle. The pneumatic outlet may become clogged as a result of the lack of flowability of the dried product, e.g., the dried animal digest particles. One possible solution to alleviate clogging would be to include chemical flow aids or nanomaterials such as silicon dioxide ($SiO_2$). However, there has been an environmental trend to remove these types of nanomaterials from many commercial products. Furthermore, even with silicon dioxide present at concentrations where there may be some clogging improvement, it is still difficult to reduce clogging sufficiently to be particularly useful with large batches of dried particles exhibiting stickiness. Thus, the benefits of using a gentle belt spray dryer (particularly without the inclusion of silicon dioxide as a flow aid) presents an engineering issue as it relates to the preparation of dried animal digest particles from liquid animal digest.

In accordance with examples of the present disclosure, a dried animal digest composition includes Dried Animal Digest (DAD) particles having an animal fat content of about 16 wt % or less and a moisture content of about 3 wt % or less. The dried animal digest particles can have a volume diameter particle size distribution where D10 is from about 20 μm to about 50 μm, D50 is from about 60 μm to about 150 μm, and D90 is from about 160 μm to about 275 μm. Furthermore, the dried animal digest composition can be substantially devoid of silicon dioxide flow aid. In some examples, the percentage of dried animal digest particles below 30 μm based on volume diameter can be from 3% to 20% and/or the percentage of dried animal digest particles below 45 μm based on volume diameter can be from 5% to 25%. A volume mean diameter of the dried animal digest particles can be from about 60 μm to about 160 μm, for example. In further detail, D10 can be from about 25 μm to about 40 μm, D50 can be from about 75 μm to about 125 μm, and/or D90 can be from about 185 μm to about 250 μm. The dried animal digest composition can, in some examples, be completely devoid of the silicon dioxide flow aid and can also be devoid of chemical flow aids selected from the group consisting of clay, flour, fly ash, quicklime, starch (native or modified), zeolite, silicates, stearates, phosphates, polysaccharides, salts of fatty acids, and carbonates, e.g., calcium carbonate, diatomaceous earth, bamboo shoot, corn cob, pea fiber, pea hull, citrus fiber, cellulose powder, and/or microcrystalline cellulose, etc. These additives can be in the form of particulates, solutions, dispersions, extracts, etc.

The dried animal digest particles can include from about 40 wt % to about 80 wt % protein and from about 10 wt % to about 16 wt % fat, for example. To keep the animal fat content low in the dried animal digest particles, in some examples, from about 80 wt % to 100 wt % of animal tissue used to prepare the dried animal digest particles can be from liver tissue, and in other examples, the animal tissue used to prepare the dried animal digest particles can be pre-processed to remove animal fat. The dried animal digest compositions of the present disclosure may be all (100 wt %) dried animal digest particles, or in some examples, from 25 wt % to 99.99 wt % of the dried animal digest composition can be from the dried animal digest particles, and from 0.01 wt % to 75 wt % of the animal digest composition can be from one or more additive selected from the group consisting of a phosphate compound, a pyrophosphate compound (e.g., tetrasodium pyrophosphate (TSPP)), a choline compound, an amino acid, a vitamin, a probiotic, egg yolk, and yeast, for example. These could be added after the drying process in some examples. However, in some examples, the dried animal digest particles can be prepared to include yeast.

In another example, a pet food composition can include kibble and dried animal digest composition applied to the kibble. The dried animal digest composition can include dried animal digest particles, and the pet food composition as a whole can include from about 0.5 wt % to about 5 wt % of dried animal digest particles. The dried animal digest particles can have an animal fat content of about 16 wt % or less and a moisture content of about 3 wt % or less based on a total weight of the dried animal digest particles. Furthermore, the dried animal digest particles can have a volume diameter particle size distribution where D10 is from about 20 μm to about 50 μm, D50 is from about 60 μm to about 150 μm, and D90 is from about 160 μm to about 275 μm. The dried animal digest composition can be substantially devoid of silicon dioxide flow aid. In some examples, the pet food composition can include from about 1 wt % to about 12 wt % additional animal fat coated on the kibble based on a total weight of the pet food composition. In other examples, the dried animal digest particles can be applied to the kibble at from about 0.8 wt % to about 3.5 wt % based on a total weight of the pet food composition. In some examples, the dried animal digest composition applied on the kibble is 100 wt % dried animal digest particles. In other examples, the dried animal digest applied on the kibble is from 25 wt % to 99.99 wt % dried animal digest particles and from 0.01 wt % to 75 wt % of one or more additive selected from the group consisting of tetrasodium pyrophosphate (TSPP), a choline compound, an amino acid, a vitamin, a probiotic, egg yolk, and yeast.

In another example, a method of preparing a pet-consumable composition, e.g., dried animal digest composition or pet food composition, can include hydrolyzing proteins and fats of raw animal tissue to form a mixture of shorter chain protein and/or peptide and fatty acids (with amino acids being formed in some examples). The method can also include introducing heat and reactant compounds to the mixture to initiate a thermal reaction and form a liquid animal digest, and drying the liquid animal digest using a belt spray dryer to form dried animal digest particles having a volume mean diameter from about 60 μm to about 160 μm, an animal fat content about 16 wt % or less, and a moisture content of about 3 wt % or less. The pet-consumable composition can be substantially devoid of silicon dioxide flow aid. In some examples, the dried animal digest particles can have a volume diameter particle size distribution where D10 is from about 20 μm to about 50 μm, D50 is from about 60 μm to about 150 μm, and D90 is from about 160 μm to about 275 μm. In other examples, the method further includes applying from about 0.5 wt % to about 5 wt % of the dried animal digest particles to kibble to form a pet food composition (based on a total weight of the pet food composition).

It is noted that when discussing examples related to dried animal digest composition, pet food compositions, and/or the methods of preparing the pet-consumable compositions described herein, such discussions can be considered applicable to one another whether or not they are explicitly discussed in the context of that example. Thus, for example, when discussing the "dried animal digest particles" in the context of dried animal digest composition, such disclosure is also relevant to and directly supported in the context of pet food compositions and methods of preparing the pet-consumable compositions, and vice versa.

Furthermore, terms used herein will have their ordinary meaning in the relevant technical field unless specified otherwise. In some instances, there are terms defined more specifically throughout the specification, with a few more general terms included at the end of the specification. These more specifically defined terms have the meaning as described herein.

Dried Animal Digest Compositions

Dried animal digest compositions of the present disclosure can be prepared from dried animal digest (DAD) particles, which may be prepared from a liquid animal digest (LAD). Essentially, a liquid animal digest can be introduced as a feed source into a dryer. The resulting dried product is referred to herein as dried animal digest particles. A belt spray dryer can be used to generate the dried animal digest particles of the present disclosure. An example belt spray drier that has been found to be suitable for use is the FILTERMAT® spray dryer. Dried animal digest compositions, on the other hand, can be prepared solely (100 wt %) from dried animal digest particles, or the dried animal digest particles can be combined or homogenously admixed with other dry additives or components, and may be added after the drying process. Thus, in some instances, the dried animal digest composition may include 100 wt % dried animal digest particles, and in other examples, the dried animal digest composition may include less than 100 wt % dried animal digest particles combined with other additives, e.g., tetrasodium pyrophosphate (TSPP), a choline compound, an amino acid, a vitamin, a probiotic, egg yolk, yeast, and/or the like. Compounds in some examples can be in the form of salts, chelates, phospholipids, hydroxides, oxides, or the like, e.g., choline halides, choline phospholipids, choline hydroxide, amino acid complexes, amino acid chelates, protein complexes, etc.

To illustrate the inclusion of additive(s), a dried animal digest composition may include from 25 wt % to 99.99 wt % dried animal digest particles and from 0.01 wt % to 75 wt % of one or more additives. In other examples, the dried animal digest composition may include dried animal digest particles at from 35 wt % to 99.99 wt %, from 50 wt % to 99.99 wt %, from 75 wt % to 99.99 wt %, or from 90 wt % to 99.99 wt %, with the other additive(s) combined therewith being present as a remainder of the dry content by weight, e.g., excluding water content. To illustrate by way of one specific example, a dried animal digest composition may include 40 wt % dried animal digest (collected from the belt spray dryer) admixed with 40 wt % yeast and 20 wt % tetrasodium pyrophosphate as additives.

In examples of the present disclosure, the dried animal digest composition includes dried animal digest particles having an animal fat content of about 16 wt % or less and a moisture content of about 3 wt % or less, and can be substantially devoid or completely devoid of silicon dioxide flow aid. In some examples, the dried animal digest particles can also be devoid of chemical flow aids selected from the group consisting of clay, flour, fly ash, quicklime, starch (native or modified), zeolite, silicates, stearates, phosphates, polysaccharides, salts of fatty acids, and carbonates, e.g., calcium carbonate, diatomaceous earth, bamboo shoot, corn cob, pea fiber, pea hull, citrus fiber, cellulose powder or microcrystalline cellulose, starches (native and modified), etc. With respect to the animal fat content, this can be, for example, from about 10 wt % to about 15.9 wt %, or from about 12 wt % to about 15.5 wt %. The moisture content, for example, can be from about 0.5 wt % to about 2.9 wt %, from about 1 wt % to about 2.7 wt %, from about 1.2 wt % to about 2.6 wt %, from about 1.5 wt % to about 2.4 wt %, or from about 1.8 wt % to about 2.0 wt %. In some examples, the dried animal digest particles can have a protein content from about 40 wt % to about 80 wt %, or from about 50 wt % to about 70 wt %.

Regarding particle size distribution, in some examples, the dried animal digest particles can have a volume diameter particle size where D10 is from about 20 μm to about 50 μm, or from about 25 μm to about 40 μm. The D50 volume diameter particle size can be from about 60 μm to about 150 μm, or from about 75 μm to about 125 μm. The D90 volume diameter particle size can be from about 160 μm to about 275 μm, or from about 185 μm to about 250 μm. In some examples, the percentage of dried animal digest particles below 30 μm based on volume diameter can be from about 3% to about 20%, or from about 5% to about 15%. In other examples, the percentage of dried animal digest particles below 45 μm based on volume diameter can be from about 5% to about 25%, or from about 10% to about 22%. In some examples, a volume mean diameter of the dried animal digest particles can be from about 60 μm to about 160 μm, or from about 80 μm to about 130 μm.

"Volume diameter particle size" refers to a theoretical spherical particle having the same volume as the particles that are physically present. Volume diameter particle size in powders for the range considered can be estimated using laser diffraction (light scattering), dynamic image analysis, or static image analysis, which can be verified, for example, using a scanning electron microscope (SEM).

Volume diameter particle sizes can be reported in terms of D10, D50, D90, or volume mean diameter values. For example, the "D50" particle size is the particle size value where about 50% (by number) of the particles are smaller and about 50% of the particles are larger, based on the equivalent spherical diameter of the particle volume. The "D10" particle size is the particle size value where about 10% (by number) of the particles are smaller and about 90% of the particles are larger. The "D90" particle size is the particle size value where about 90% (by number) of the particles are smaller and about 10% of the particles are larger. The volume mean diameter is similar to the D50 value, but instead of being at the mid-point of particles, this value represents the average diameter based on an equivalent spherical particle volume.

To generate dried animal digest particles having about 16 wt % or less animal fat content, a good starting animal tissue can be liver from any of a number of animals, e.g., chicken, pork, beef, etc. Thus, in some examples, the dried animal digest particles can be prepared from 80 wt % to 100 wt % liver tissue. In other examples, the animal tissue used to prepare the dried animal digest particles can be pre-processed to remove animal fat, using a process such as centrifugation.

In accordance with industry standards, there are generally two types of animal digest compositions, namely natural animal digests and non-natural animal digests. Natural animal digests can include some additives used for processing but not others. Otherwise, the animal digest is considered to be non-natural. For example, an animal digest is considered a "natural" animal digest if it contains ingredients/additives such as naturally derived amino acids, amino-peptides, amino-proteins, reducing sugars, and/or other natural additives, but does not contain certain artificial additives and/or preservatives. In further detail, the AAFCO defines natural as a feed or feed ingredient derived solely from plant, animal, or mined sources, either in its unprocessed state or having been subject to physical processing, heat processing, rendering, purification, extraction, hydrolysis, enzymolysis or fermentation, but not having been produced by or subject to a chemically synthetic process and not containing any additives or processing aids that are chemically synthetic except in amounts as might occur in good manufacturing practices. For example, additives such as tocopherols, rosemary extract, and ascorbic acid may be included as antioxidants in accordance with the definition of natural ingredients as defined by the AAFCO. Additives such as BHA, PG, BHT, and OG are examples of non-natural ingredients as defined by the AAFCO. Notably, this relates to the US definition, but the European related regulations are more restrictive. For example, xylose is considered natural in the US as found in nature, but is not considered natural in Europe as the extraction process is beyond the processes that would qualify it as natural. Thus, as defined herein, the distinction between natural and non-natural is based on the U.S. definition as defined as of the date of the earliest priority filing of the present application.

In accordance with examples of the present disclosure, the dried animal digest compositions can be prepared from either natural or non-natural liquid animal digests, resulting in compositions containing either natural or non-natural dried animal digest particles.

Furthermore, in some examples, the dried animal digest compositions can be prepared to include dried animal digest particles with one or more antioxidant included therein. For example, the liquid animal digest used to prepare the dried animal digest particles can include antioxidant(s) that were added at any stage of the preparative process. For example, antioxidant(s) may have been added before or during digestion while breaking down proteins and/or fat. Antioxidant(s) may have likewise been added after digestion, such as before, during, or after the reaction process. In particular, antioxidants can be used to prevent oxidation that is often associated with the presence of fats. By including from about 0.01 wt % to about 0.2 wt % antioxidant(s), the resultant liquid animal digest and ultimately, the resultant dried animal digest composition can be protected from oxidation. Examples of antioxidants that can be selected for use include natural or synthetic antioxidants, such as butylated hydroxyanisole, butylated hydroxytoluene, propyl gallate, octyl gallate, tocopherols, rosemary extract, ascorbic acid, citric acid, or a combination thereof.

Pet Food Compositions

In accordance with other examples herein, pet food compositions can be prepared. For example, the dried animal digest particles can be prepared and applied to any of a number of pet food bases/pellets, which are described herein generally as "kibble." The term "applied to" refers to combining the dried animal digest particles with the kibble by coating on the kibble, incorporating within the kibble, admixing homogenously with the kibble, or a combination thereof. The dried animal digest used to prepare the pet food compositions can include hydrolyzed animal tissue, antioxidant(s), and/or other additives which may be prepared as a liquid animal digest and then dried as described herein to retain about 16 wt % or less animal fat content and less than 3 w % moisture content. For example, from about 0.5 wt % to about 5 wt %, or from about 0.8 wt % to about 3.5 wt % of the dried animal digest particles can be applied to the kibble, based on a total weight of the pet food composition.

The dried animal digest particles that are used to apply to the kibble can have a volume diameter particle size distribution where D10 is from about 20 μm to about 50 μm, D50 is from about 60 μm to about 150 μm, and D90 is from about 160 μm to about 275 μm. Furthermore, the dried animal digest composition can be substantially devoid of silicon dioxide flow aid, or in some instances, completely devoid of silicon dioxide flow aid.

Additional details related to the dried animal digest compositions prepared that include the dried animal digest particles described above are applicable to the pet food compositions and are incorporated herein. However, the weight percentages of the various components within the dried animal digest compositions can be converted to weight percentages of these various components as applied to kibble in forming pet food compositions based on solids content. In other words, unless the context clearly dictates otherwise, when referring to the content of any particular ingredient in the pet food compositions described herein, the weight percent relates to the content with the pet food composition based on the entire weight of the pet food composition after preparation. For example, dried animal digest particles applied to kibble can include the use of the dried animal digest compositions described previously which may include up to about 16 wt % animal fat content (based on the total weight of the dried animal digest composition), but after being applied to the kibble at an application weight from about 1 wt % to about 3 wt % (based on the total weight of the pet food composition), the animal fat content provided by the dried animal digest composition remains with the pet food composition at up to about 0.16 wt % to about 0.48 wt % in this example. With respect to the moisture content of the dried animal digest compositions being less than 3 w %, there would also likely be an inherent moisture content of the kibble, so this value would be primarily based on the moisture content of the kibble with minor influence provided by the application of the dried animal digest particles of the dried animal digest composition. With this in mind, a moisture content of the pet food composition as a whole may typically be in the range of about 2 wt % to about 12 wt %, about 3 wt % to about 10 wt %, or about 4 wt % to about 10 wt % when packaged for distribution and/or other use. Immediate packaging can be carried out in some instances if the objective is to retain some moisture. Moisture content outside these ranges may also be present, but these moisture content ranges provide a good balance between saving on energy associated with removing excess moisture and waste associated with retaining a higher moisture content, e.g., without the use of added preservatives.

In further detail, the dried animal digest composition that may be applied to the kibble can include not only the dried animal digest particles, but also other additives such as antioxidant(s), which can be added to protect the hydrolyzed animal fat from unwanted oxidation during preparation of the dried animal digest composition and/or during storage prior to use. As mentioned, antioxidant(s) can be added prior to (at or after animal tissue grinding to add to the reactor) or during the digestion process when the liquid animal digest is being prepared prior to drying, but could likewise be added at a later time in the overall process of preparing the dried animal digest composition. Oxidation can begin immediately upon grinding the animal tissue, and can accelerate when heating, so adding antioxidant(s) at about this time may be more typical. It is also noted that stabilizing components or formulation components can be added during digestion or at any stage during the preparation of the dried animal digest as well. However, in accordance with examples of the present disclosure, silicon dioxide flow aids are typically not included. The drying processes described herein can lead to the formation of dried animal digest particles that are sufficiently flowable and non-sticky to avoid clogging of the pneumatic outlet after the drying process using a belt spray dryer device, for example. Other additives that may be included may promote enhanced palatability, such as for example, the addition of pyrophosphates and/or yeast, which may be incorporated to the dried animal digest particles for drying and/or may be incorporated into the dried animal digest composition as a whole after drying. The pyrophosphates and/or yeast can be present in the pet food composition (as a whole based on a total weight of the pet food composition) at concentrations as previously described.

In some examples, other palatability and/or nutrition additives can likewise be applied to or incorporated in the kibble, such as a separate application of animal fat, e.g., rendered fat of an animal, or even plant oil. If additional animal fat is added to the dried animal digest composition, it would typically not be added prior to drying of the dried animal digest particles, as additional animal fat added to bring the total animal fat content above 16 wt % to the dried animal digest particles could lead to pneumatic pipe clogging. In other examples, additional animal fat can be applied to the kibble separately relative to the application of the dried animal digest composition. The animal fat that can be used may not have been partially hydrolyzed or may remain fully unhydrolyzed. Examples of animal fat or rendered animal fat that can be used include beef tallow, rendered pork fat, chicken fat, fish fat, etc. The animal fat can be applied within a weight range of from about 1 wt % to about 12 wt %, from about 2 wt % to about 12 wt %, from about 3 wt % to about 10 wt %, or from about 4 wt % to about 10 wt %, based on a total weight of the pet food composition. Application of additional animal fat to the kibble can provide a palatability enhancement in some instances. Once the dried animal digest composition is prepared, in some instances, the dried animal digest composition can be applied to the kibble using any of a number of techniques, such as batch mixing and/or continuous mixing, co-pelleting, etc.

Methods of Preparing Pet-Consumable Compositions

In accordance with other examples of the present disclosure, a method of preparing a pet-consumable composition is disclosed. The term "pet-consumable composition" is a term that includes both the dried animal digest compositions as well as the pet food compositions prepared using the dried animal digest compositions described herein. The method can include hydrolyzing proteins and fats of raw animal tissue to form a mixture of shorter proteins and/or peptide and fatty acids, and in some instances amino acids may also be produced. The method can further include introducing heat and reactant compounds to the mixture to initiate a thermal reaction and form a liquid animal digest. As an example, amino acids may be generated, depending on enzymes used. Regarding the animal fats, fatty acids may be generated from triglycerides (triacylglycerol, TAG, or triacylglyceride), which may particularly be the case when liver is used as the raw animal tissue, e.g., triglycerides are produced in the liver. However, fatty acids may also be hydrolyzed from phospholipids in some examples.

In further detail, the method can include drying the liquid animal digest along a belt spray dryer, such as a FILTERMAT® spray dryer, to form dried animal digest particles having a volume mean diameter (VMD) from about 60 μm to about 160 μm, an animal fat content about 16 wt % or less, a moisture content of about 3 wt % or less, and being substantially devoid of silicon dioxide flow aid. Additional details regarding the volume diameter particle sizes, volume mean diameters, percentages of particles below 30 μm and 45 μm, etc., that can be used in the methods are provided previously. In some examples, the method can further include applying from about 0.5 wt % to about 5 wt %, or from about 0.8 wt % to about 3.5 wt % of the dried animal digest particles to the kibble, based on a total weight of the pet food composition. In further detail, with respect to the pet food composition, the method can include applying from about 1 wt % to about 12 wt %, from about 2 wt % to about 10 wt %, or from about 3 wt % to about 8 wt % of a fat coating to the pet food composition based on the dry content of the pet food composition.

As mentioned, the dried animal digest particles (DAD) are prepared from a liquid animal digest (LAD). The liquid animal digest can be prepared by sequentially following two processes, namely a digestion process followed by a thermal reaction process. Regarding digestion, animal tissue from muscle, organs (viscera, liver, etc.), epithelial tissue, connective tissue, fat, etc., of sources such as beef, chicken, pork, lamb, venison, sheep, fish, crustaceans, insects, shellfish, or the like can be ground and blended together.

In further detail regarding the selection of raw animal tissue with low initial animal fat content, suitable examples include various liver tissues, e.g., chicken liver, pork liver, beef liver, etc. For example, chicken and/or pork liver may have an initial percentage from about 2.5 wt % to about 6 wt %, or from about 3 wt % to about 5 wt % animal fat content, with the pork liver being typically slightly lower in animal fat content than the animal fat content in chicken liver. The drying process can increase the total relative weight percentage of the animal fat content as volatiles, e.g., moisture, is evaporated from the liquid animal digest. However, in accordance with the present disclosure, the dried animal digest particles prepared therefrom can be kept at or below about 16 wt % in animal fat content, particularly if the raw animal tissue selected for inclusion includes a large proportion of liver tissue, for example. To illustrate, a blend of 50 wt % chicken liver and 50 wt % pork liver can be used to prepare dried animal digest particles having from about 12 wt % to less than about 16 wt % animal fat content or from about 13.5 wt % to about 15.5 wt % animal fat content, and also having about 3 wt % or less moisture content. In further detail, there are other raw animal tissues or blends of raw animal tissues available for use that have a somewhat higher initial animal fat content, but can still be relatively low in initial animal fat content, e.g., heart tissue, blends of liver and heart tissue, blends of liver and heart and lung tissue (sometimes referred to as "pluck" or "chicken pluck" in the case of chicken sourced raw animal tissue). If used in appropriate amounts, various blends of raw animal tissue (other than those made solely from liver) can be used to prepare dried animal digest particles having about 16 wt % or less fat content. For example, a blend of 80 wt % liver and up to 20 wt % of other tissues for the animal tissue, e.g., meat, component of the formulation may result in a final dried animal digest particle which is also about 16 wt % or less animal fat. More specifically, pork liver having about 3 wt % initial animal fat content can be combined with a pluck and chicken heart blend having about a 6 wt % initial animal fat content at a 4:1 weight ratio, resulting in dried animal digest particles having a 15.1 wt % animal fat content. In some examples, if more of the higher fat-containing animal tissues are used initially, then the animal tissue may be pre-processed to remove some of the animal fat content so that the dried animal digest particles remain at about 16 wt % or less animal fat content. For example, animal tissue may be pre-processed using centrifugation or other methodologies where a portion of the animal fat can be removed prior to drying in the belt spray dryer in accordance with the present disclosure.

For purposes of the present disclosure, the term "raw animal tissue" refers to any animal tissue, including meat, fat, bone, organs, sinew, etc., that may be collected and used to make the liquid animal digest of the present disclosure. The Association of American Feed Control Officials (AAFCO), for example, defines animal digest to include material which results from chemical and/or enzymatic hydrolysis of clean and un-decomposed animal tissue, and that the animal tissues used shall be exclusive of hair, horns, teeth, hooves and feathers, except in such trace amounts as might occur unavoidably in good factory practice and shall be suitable. Thus, in many examples, ground up or pulverized raw animal tissue that can be used to make liquid animal digest that conforms with the AAFCO definition can include meat from muscle, organs (viscera, liver, etc.), epithelial tissue, connective tissue, fat, etc., from sources such as beef, chicken, pork, lamb, venison, sheep, fish, crustaceans, insects, shellfish, or the like. In more specific detail, the raw animal tissue may include some meat or other tissue that is edible but which may not otherwise be going to the human food supply chain. For example, the raw animal tissue may include "meat mix," which can be a ground up mixture of animal tissue, e.g., pork, liver, spleen, trachea, lung, etc. With that stated, in accordance with the present disclosure, the selection of raw animal tissue should be such that the dried animal digest particles formed therefrom have an animal fat content of about 16 wt % or less and a moisture content of less than about 3 wt %.

Once the raw animal tissue is selected, ground up, and blended, steam can be used to obtain a pumpable mixture that can be readily transferred to a reactor for the digestion process to begin. The pumpable mixture of animal tissue used to form the liquid animal digest can include or be mixed with ingredients for the digestion process other than the major portion of the raw animal tissue, such as technical enzymes (e.g., 0.01 wt % to 1 wt % for hydrolyzing the animal tissue), and in some instances pH adjusting agents (e.g., 0.1 wt % to 1.5 wt % to meet pH targets), antioxidants (e.g., 0.01 wt % to 0.2 wt %), and/or yeast. Thus, digestion may be carried out on the raw animal tissue using technical enzymes, which may include proteases, lipases, or both where the animal tissue may be hydrolyzed. Example proteases may include chymosin, pepsin, trypsin, papain, bromelain, subtilisin, etc. Some raw animal tissue, such as animal viscera, may be used that inherently introduces proteases and/or lipases. These enzymes can either be leveraged for use during digestion, or heat or other processes can be used to inactivate some or all of those enzymes in favor of the addition of technical enzymes. pH and temperatures can be adjusted as may be appropriate for a given application. For example, the pH may be adjusted as desired using sodium hydroxide, potassium hydroxide, phosphoric acid, etc. For example, in some examples, pH can be increased, e.g., adding sodium or potassium hydroxide, for enhanced functionality of enzymes used during digestion. In other examples, pH can be decreased, e.g., adding phosphoric acid, for enhanced enzyme activity or for some other purpose. Temperature can be adjusted by adjusting (raising or lowering) the added steam in a manner that is compatible with the enzymes used, e.g., temperatures selected high enough to carry out digestion but low enough for enzyme activity to be maintained.

If yeast is added to the pumpable mixture or raw animal tissue (or anytime thereafter) during the preparation of the liquid animal digest, it may be included therein at any amount where the dried animal digest produced therefrom includes at least 50 wt % animal tissue content with less than 16 wt % animal fat. Thus, even when a relatively large amount of yeast is included, the raw animal tissue may be present at 50 wt % or more, and typically 60 wt % or 70 wt % or more of the pumpable mixture includes the raw animal tissue. In some examples, the raw animal tissue can be present in the pumpable mixture at 80 wt % or more, 90 wt % or more, 95 wt % or more, or 98 wt % or more in preparation of the liquid animal digest, even if the other components are added later in the process of preparing the liquid animal digest. In further detail, if yeast is added in preparing the liquid animal digest feed stock (for preparing the dried animal digest particles), the raw animal tissue may be combined with yeast at a tissue to yeast weight ratio of from about 2:1 to about 199:1, from about 3:1 to about 99:1, from about 4:1 to about 99:1, or from about 6:1 to about 50:1. In some examples, as mentioned, there may be yeast added at the liquid animal digest preparation stage. That stated, the addition of some yeast in preparing the liquid animal digest can provide another method of reducing the total animal fat content present in dried animal digest particles formed during the belt spray drying process described herein. Notably, in preparing the dried animal digest compositions as described herein, there may also be yeast or other additives combined with the dried animal digest particles (which may or may not already include some yeast).

In some example preparations of liquid animal digest, raw animal tissues can be ground up and then processed to result in an intermediate product which includes the hydrolyzed animal tissue. The term "hydrolyzed" with respect to animal tissue, e.g., protein and/or fat, relates to raw animal tissue that has been broken down to shorter chain length proteins, peptides, and/or fatty acids based on an average chain length compared to proteins and/or fats of the raw animal tissue source. The hydrolyzed animal tissue may be broken down via any of a number of processes, including processes that utilize heat, shearing, acids, and/or enzymes, for example.

Hydrolyzed animal tissue is thus formed in a process referred to as "digestion," which is the process of breaking down the raw animal tissue and adding certain components, thus leaving the hydrolyzed animal tissue behind. As a note, "digestion" or "digestion process" does not refer to digestion that occurs within the GI tract of an animal, but rather is a term of art that refers to the breaking down of proteins and/or fats in the preparation of animal digests. To illustrate, processing raw animal tissue via digestion may include the use of enzymes, such as proteases to break down the proteins in the raw animal tissue, and in some instances, lipases to break down the fats in the animal tissue. Enzymes are typically used and inactivated during the digestion and thus are considered to be processing aids. Other chemicals or components can be included additively or alternatively to break down fats and/or proteins. In further detail regarding the enzymes that can be added, e.g., proteases and/or lipases, these enzymes are sometimes referred to as "technical enzymes," which are not the same as the natural enzymes that may inherently be present in the raw animal tissue. As an example, with specific reference to proteases, there are multiple types of technical enzymes or enzyme packages that can be used for digestion, including endoproteases which breaks the peptide bonds of nonterminal amino acids in proteins within the proteins or peptides and/or exopeptidases which cleave off amino acids at the end of proteins or peptides. Examples of endoproteases include chymosin, pepsin, trypsin, papain, bromelain, subtilisin, etc. Some raw animal tissue, such as animal viscera, may be used that inherently includes proteases and/or lipases. These enzymes can either be leveraged for use during digestion, or heat or other processes can be used to inactivate some or all of those enzymes in favor of the addition of technical enzymes.

If heat is used during the digestion process, heating can be carried out by any of a number of processes, such as steam injection, jacket heating, etc. In some examples, steam injection can be particularly useful as it uses a relatively small amount of water, e.g., from about 5 wt % to about 25 wt % or from about 7.5 wt % to about 20 wt % water based on the total weight of the components used to prepare the liquid animal digest, and can also provide rapid heating to facilitate the breaking down of the raw animal tissue to hydrolyzed animal tissue. Heating can also be used to arrest or stop enzymatic activity of some enzymes. For example, some raw animal tissue includes protease and lipase enzymes, but at temperatures above about 55-60 °C, many of those enzymes may become inactivated. As the temperature rises, other enzymes also can become inactive. Thus, in some examples, technical enzymes can be added that survive at temperatures greater than about 55 °C or greater than about 65 °C so that the added technical enzymes are those which primarily act to hydrolyze the raw animal tissue. In some systems, the processing temperatures may be from about 55 °C to about 80 °C, from about 62 °C to about 80 °C, from about 65 °C to about 77 °C, from about 65 °C to about 74 °C, from about 65 °C to about 72 °C, or from about 68 °C to about 74 °C, for example. Temperatures outside of these ranges can be used, as these ranges are provided for example purposes only based on many of the technical enzymes that can be used in carrying out digestion. In accordance with this, a heating temperature profile can be selected that allows for some or all enzymatic activity to occur during digestion.

After digestion, the intermediate digest composition undergoes a "reaction process" or "reaction," which is sometimes referred to as the "Maillard reaction." The reaction process may be a thermal reaction process in some instances. The reaction process relates to the stage where additional flavoring of the digests occurs. More specifically, the Maillard reaction is an organic chemical reaction where reducing compounds, such as sugars, react with amino acids to form a complex mixture of volatile and non-volatile compounds. This reaction can be classified as a non-enzymatic browning reaction, which can occur at a variety of temperatures from room temperature to well above room temperature. However, in many reaction processes, the process is a "thermal reaction" process occurring at elevated temperatures, e.g., from about 80 °C to about 130 °C, from about 80 °C to about 115 °C or typically from about 90 °C to about 105 °C, which may be higher in temperature than that used during the digestion process. The reaction process can generate several flavoring compounds that may be broken down from other flavoring compounds, depending on the favoring compound added, the temperature applied, the pH and/or the time profiles used. In some examples, an amino compound, such as an amino acid, amino peptides, and/or amino proteins, can be combined with a reducing sugar, e.g., monosaccharides (such as xylose, ribose, fructose or glucose), disaccharides (such as lactose), to start the reaction under heat. Additionally, during the reaction process, compounds used to start the reaction (or other added compounds) can be selected for use to meet a flavoring profile, depending on the type of animal the dried animal digest composition will be used to feed. Thus, any of a number of specific compounds can be used in the reaction process to provide various flavoring profiles, such as any of the naturally occurring amino acids, amino proteins and/or peptides, xylose, ribose, fructose, glucose, lactose, etc. that may be added to modify the flavor and/or enhance the nutrition of the dried animal digest composition being prepared.

Thus, the reaction process can be initiated to bring the mixture to a suitable temperature for the thermal reaction to occur. The liquid animal digest prepared from this process may then be filtered to remove any non-digested material, and the liquid animal digest may be ready as a feed stock material for introduction into a belt spray dryer. In some examples, the liquid animal digest may be transferred directly to a surge tank without the need for cooling, concentration, or pH adjustment. The surge tank can be used to introduce the liquid animal digest into a belt spray dryer, such as that shown in FIG. 1 hereinafter by way of example.

In some examples of the present disclosure, it has been found that the preparation of dried animal digest particles can be carried out without the inclusion of certain chemical flow aids, such as silicon dioxide. Many industries are getting away from nanoparticles in their products for environmental reasons, but removing a chemical flow control aid from a drying process can be problematic. For example, when feeding traditional liquid animal digest into a belt spray dryer, surfaces of the particles formed can become sticky and clump together, clogging machinery, and thus, interrupting the manufacturing process. The small size of some of the particles can also contribute to the clogging of machinery if not controlled. Furthermore, even with the inclusion of some silicon dioxide as a flow aid for the dried animal digest particles, there still can be some clogging that may occur.

In accordance with this, it has been recognized that by formulating the liquid animal digest such that the resultant dried animal digest particles prepared therefrom have a low animal fat content, e.g., about 16 wt % or less animal fat content, and by drying the particles to less than about 3 wt % moisture content, the use of a belt spray dryer can occur. The belt spray dryer provides a few benefits in the manufacture of dried animal digest particles, including good control of particle size distribution as well as a more gentle drying process compared to other spray drying methodologies. By controlling the animal fat content, the moisture content, and the particle size distribution as prescribed herein, the dried animal digest particles that are formed for dispensing through the pneumatic pipe are sufficiently non-tacky, flowable, and dispensable to avoid clogging, even without the presence of added silicon dioxide flow aid.

To provide additional detail, referring now to FIG. 1, an example belt spray dryer 100 is shown where a liquid animal digest feed stock 102 is introduced from a surge tank 104 into a drying chamber 120 via a plurality of nozzles 110, where an atomization pressure generates atomized feed stock 112. The parameters of the drying chamber can be controlled by the delivery of heated air via an airflow delivery assembly including air intakes 142A, air intake valves 144A, air filters 146A, and inline heaters 148A in this specific example. Thus, atomized feed stock of the liquid animal digest falls through the drying chamber and is partially dried to form sticky particles 114 that are received by a dryer conveyer 130. While the sticky particles are passing along the dryer conveyer, some of the smaller particles 118 may drop through the dryer conveyer, which is porous, and pass through a small particle collector assembly 132 where the small particles may be transported to a bag filter assembly 134 for reprocessing. The bag filter assembly may include valves, an exhaust assembly 136, and/or other components to remove fines 138 therefrom. The sticky particles on the dryer conveyer are transported through a plurality of dryer zones, as shown at 140A, 140B, and 140C. Heat and airflow are delivered to the various dryer zones that may be unique to that specific dryer zone using another airflow delivery assembly. This second airflow assembly may likewise include air intakes 142B, air intake valves 144B, air filters 146B, and an inline heater 148A. Thus, one of the lines (h) may be heated. However, as cool air may delivered as well, one of the lines (c) may be devoid of the inline heater, as shown in this specific example. As shown in this example, a heat distribution manifold 150 can be used to create a drying profile, e.g., heat and airflow, in the various dryer zones, shown at 140A-C. As an example, dryer zone 140A may be configured to receive more heat than dryer zone 140B, and dryer zone 140B may be configured to receive more heat than dryer zone 140C, which is the configuration shown in this FIG., though the drying profile may be different than that shown as well.

After passing through the various dryer zones 140A-C, partially dried animal digest particles are delivered from a dryer outlet 160 to a pneumatic pipe 162, which includes a pneumatic transport 162A and a pneumatic outlet 162B in this specific example. The dried animal digest particles 116 that are delivered to the pneumatic transport may or may not have a moisture content of about 3 wt % or less at this point, but by the time the dried animal digest particles are delivered to the collection receptacle 180 or storage container through the pneumatic outlet, the delivered dried animal digest particles should have a moisture content of about 3 wt % or less (and an animal fat content about 16 wt % or less), based on a total weight of the dried animal digest particles.

When the dried animal digest particles arrive at the pneumatic outlet for delivery to the collection receptacle, if there are too many small particles present, the pneumatic pipe, e.g., pneumatic transport and/or pneumatic outlet, can become clogged, stopping production. For example, the presence of too many small particles less than about 10-15 μm (based on volume diameter particle size) can result in clogging issues. In some instances, if the percentage of dried animal digest particles below about 15 μm is more than about 5-10% by particle count, the propensity for clogging can increase fairly significantly. Furthermore, a reduced propensity for clogging may also occur if small dried animal digest particles less than 30 μm in size are kept below about 10-15% and/or if small particles less than 45 μm in size are kept below about 20-25% by particle count. With this in mind, in some examples, the dried animal digest particles may or may not be sent through a grinder 164 for further particle sizing to grind larger particles to smaller, more consistent sizes, but also to sift out some of the very small particles or fines 168, which may drop out of the bottom of the grinder through a particle sizer 166. In some examples, there may or may not be a grinder present. These very small particles or fines that may otherwise contribute to clogging may be removed at this stage of the processing. Thus, in some examples, very small particles can be removed at the dryer conveyer 130 as previously described and/or just prior to being dispensed by the pneumatic outlet at the grinder. Most of the smaller particles may be removed along the belt in some examples.

The liquid animal digest can be dried in the belt spray dryer under a variety of conditions. For example, a FILTERMAT® spray dryer may be set in some examples with a primary burner at about 200 °C to 240 °C, a secondary burner at 80 °C to 140 °C, a chamber outlet at 65 °C to 80 °C, and an atomization pressure from 50 bars to 125 bars. In some instances, there may be three or more drying zones, each with different temperatures and air flows, e.g., decreasing temperatures and/or air flows, in order to gently dry the particular (and initially sticky) dried animal digest particles passing along the belt in order to obtain dried animal digest particles having a moisture content and animal fat content to promote lower levels of pneumatic pipe clogging that may otherwise occur when dispensing the dried animal digest particles into a collection receptacle.

These belt spray dryer settings are exemplary only, but it is noted that several modifications and/or settings were evaluated to try to reduce the number of small particles to avoid clogging. However, it was recognized that by merely adjusting some of the settings on the FILTERMAT® spray dryer, only a modest reduction of small particles was achieved, which was not typically enough of a reduction in the very small particles to avoid clogging. For example, marginal improvement in ameliorating the presence of small particles can occur by decreasing the atomization pressure applied to the nozzles 110, e.g., a 15 bar decrease (−15 bar), reducing the number of small particles only modestly. Likewise, modest decreases of particle size generation could likewise be achieved by increasing drying chamber 120 depression from −1.5 mm to −7.0 mm ($H_2O$ column), but again the decrease in small particle size was only modest. Other changes in parameters lead to increased numbers of small particles, leading to dryer outlet and/or pneumatic outlet clogging.

As it was found that modification of the processing parameters of the belt spray dryer 100 did not provide a large enough impact to significantly reduce clogging by reducing the number of small particles in the dried animal digest particles being prepared, modification of the formulations used to prepare the dried animal digest particles provided a more impactful solution to prevent clogging. Furthermore, as it was not desirable to add silicon dioxide as a chemical flow aid, the problem of formulating became even more challenging. In accordance with this, the dried animal digest compositions of the present disclosure were formulated to include dried animal digest particles having animal fat content of about 16 wt % or less and a moisture content of about 3 wt % or less. Feed stock formulations of liquid animal digest that lead to these properties significantly enhanced the ability of the pneumatic pipe to continue to flow reliably without significant clogging risk.

For example, the dried animal digest particles can be prepared from animal sources that, when prepared and dried as described herein, may result in from about 40 wt % to about 80 wt % or from about 50 wt % to about 70 wt % protein content. The animal fat content of the dried animal digest particles can be about 16 wt % or less, from about 10 wt % to less than about 16 wt %, or from about 12 wt % to about 15.5 wt %. As mentioned, the moisture content can be about 3 wt % or less, or in some examples, the moisture content can be from about 0.5 wt % to about 2.9 wt %, from about 1 wt % to about 2.7 wt %, or from about 1.2 wt % to about 2.6 wt %. In some examples, the dried animal digest particles can have a protein content from about 40 wt % to about 80 wt %, or from about 50 wt % to about 70 wt %.

Regarding particle size distribution, in some examples, the dried animal digest particles can have a volume diameter particle size where D10 is from about 20 μm to about 50 μm, or from about 25 μm to about 40 μm. The D50 volume diameter particle size can be from about 60 μm to about 150 μm, or from about 75 μm to about 125 μm. The D90 volume diameter particle size can be from about 160 μm to about 275 μm, or from about 185 μm to about 250 μm. In some examples, the percentage of dried animal digest particles below 30 μm based on volume diameter can be from about 3% to about 20%, or from about 5% to about 15%. In other examples, the percentage of dried animal digest particles below 45 μm based on volume diameter can be from about 5% to about 25%, or from about 10% to about 22%. In some examples, a volume mean diameter of the dried animal digest particles can be from about 60 μm to about 160 μm, or from about 80 μm to about 130 μm.

As mentioned, the dried animal digest particles that are prepared can be in the form of a dried animal digest composition, or the particles can be blended or combined with other ingredients to form the dried animal digest composition. Thus, the dried animal digest composition can be 100 wt % dried animal digest particles collected from the belt spray dryer, or can include less than 100 wt % of the dried animal digest particles collected from the belt spray dryer which is then combined or blended with additives. These additives can be included at from about 0.01 wt % to about 75 wt %, from 0.01 wt % to about 65 wt %, from about 0.01 wt % to about 50 wt %, from about 0.01 wt % to about 25 wt %, or from about 0.01 wt % to about 10 wt %, for example, with the dried animal digest particles making up the balance of the dry content by weight, e.g., excluding water content. Additive weight percentages outside of these ranges can likewise be used, depending on the nutritional, palatability, and/or stability profile objectives.

In some examples, flavoring additives, nutritional additives, stabilizing additives, antioxidants, or other types of additives may be blended with the dried animal digest particles as part of the dried animal digest composition. These additives used to formulate the dried animal digest compositions are in addition to any of these or other ingredients that were used in preparing the liquid animal digests that were introduced into the belt spray dryer to form the dried animal digest particles. With this in mind, example additives that may combined or blended with the dried animal digest particles to form a dried animal digest composition include tetrasodium pyrophosphate (TSPP), yeast, amino acids, vitamins, e.g., B1 (thiamin), probiotics, egg yolk, yeast, etc. For example, dried animal digest particles can be blended with tetrasodium phyrophosphate at a weight ratio of about 50:1 to about 300:1 to form a dried animal digest composition that includes at least these two compounds. In other examples, dried animal digest particles can be blended with a probiotic at a DAD to probiotic weight ratio of about 3:1 to about 30:1, from about 5:1 to about 20:1, or from about 7.5:1 to about 15:1 to form a dried animal digest composition that includes at least these two compounds. Other example formulations can be prepared from any of these or other combinations of dried animal digest particles and additives to form unique and useful dried animal digest compositions in accordance with the present disclosure.

When the pet-consumable composition being prepared is the pet food composition, the dried animal digest composition can be incorporated with kibble, which may be in the form of large particles or pieces of dry or semi-dried pet bulk feed material suitable for use as pet food, for example. The kibble may be that suitable for bird feed, farm animal feed (horses, cows, goats, sheep, donkeys, pigs, etc.) cat food, dog food, rodent food, rabbit food, etc. The kibble may be uncoated or may be pre-coated with from about 1 wt % to about 12 wt %, from about 2 wt % to about 10 wt %, or from about 3 wt % to about 8 wt % of a fat coating, based on the total weight of the pet food composition. The fat coating can provide enhanced palatability to the target animal, for example, and can be provided by animal fat and/or plant oil, for example. Example animal fats may include poultry fat, lard (pork fat), tallow (beef fat), or the like. The fat coating can be applied to the kibble by spray or dusting onto the kibble pieces.

In some examples, the dried animal digest composition may be blended homogenously with the kibble to form the pet food composition. In other examples, the dried animal digest may be dusted with the dried animal digest composition. As mentioned, the dried animal digest composition may be solely 100 wt % of the dried animal digest particles, or may be blended or combined with other additives.

DEFINITIONS

The term "pet" refers to domesticated or other animals that are kept by humans as companion animals, such as avian; equine; feline; canine; rodent, e.g., hamsters, guinea pigs, mice, gerbils, etc.; lagomorph, e.g., rabbits; ferrets; cattle; goats; sheep; donkeys; pigs, etc.

The term "about" means plus or minus 10%; in another aspect, plus or minus 5%; and in one specific aspect, plus or minus 2%. For example, in one aspect where about is plus or minus 10% of a numeric value, the phrase "from about 5% to about 10%" could include a range from 6% to 8% or 7% to 10%, including any subranges therein. Furthermore, ranges here that include "about" therewith also expressly include the exact value notated. For example, the phrase "about 16 wt % or less" is expressly supports a direct teaching of "16 wt % or less" as a subrange.

As used herein, "comprising" or "including" language or other open-ended language can be substituted with "consisting essentially of" and "consisting of" as if such transition phrase is expressly included in such examples.

The term "substantially" when referring to the absence of a component indicates that the material is not present in any concentration greater than trace amounts, such as amounts that might inherently be present as an impurity or in an amount that is low enough that it does not provide a function to which it is typically used. For example, a composition that includes a small amount of silicon dioxide flow aid that does not provide measurable flow enhancement could be still considered to be "substantially devoid of silicon dioxide flow aid," and particularly so if present in trace amounts. In some examples, a composition may be "substantially devoid" of a compound if it is present at less than about 0.05 wt %, or even less than about 0.01 wt %, for example.

All percentages expressed herein are by weight of the composition that is referenced based on a dry matter basis unless specifically stated otherwise. For example, a weight percentage of a component in a dried animal digest composition is based on a total weight of a dried animal digest composition. A weight percentage of a component of a pet food composition is based on a total weight of the pet food composition.

As used herein, ranges are in shorthand so as to avoid having to list and describe each and every value within the range. Any appropriate value within the range can be selected, where appropriate, as the upper value, lower value, or the terminus of the range, and thus should be interpreted flexibly to include the numerical values explicitly recited as the limits of the range, and also to include individual numerical values or sub-ranges encompassed within that range as if numerical values and sub-ranges are explicitly recited. As an illustration, a numerical range of "about 1 wt % to about 5 wt %" should be interpreted to include the explicitly recited values of about 1 wt % to about 5 wt %, and also to include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting one numerical value. Furthermore, such an interpretation should apply regardless of the breadth of the range or the characteristics being described.

As used herein, the singular form of a word includes the plural, and vice versa, unless the context clearly dictates otherwise. Thus, the references "a," "an," and "the" are generally inclusive of the plurals of the respective terms. For example, reference to "a dried animal digest composition," "the pet food composition," "a method," etc. includes a plurality of such dried animal digests, pet food compositions, methods, etc.

The term "example(s)," particularly when followed by a listing of terms, is merely exemplary and illustrative and should not be deemed to be exclusive or comprehensive.

The methods and compositions and other advances disclosed herein are not limited to particular methodology, protocols, and reagents described herein because, as the skilled artisan will appreciate, they may vary. Further, the terminology used herein is for the purpose of describing particular examples only, and is not intended to and does not limit the scope of that which is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although compositions, methods, articles of manufacture, or other means or materials similar or equivalent to those described herein can be used in the practice of the present invention, certain compositions, methods, articles of manufacture, or other means or materials are described herein.

As used herein, a plurality of elements, compositional components, and/or materials may be presented in a common list for convenience. However, these lists should be construed as though individual members of the list are individually identified as separate and unique members. Thus, no individual member of such list should be construed as a de facto equivalent of any other member of the same list solely based on presentation in a common group without indications to the contrary.

EXAMPLES

Features of the present disclosure can be further illustrated by the following examples, although it will be understood that these examples are included merely for purposes of illustration and are not intended to limit the scope of the invention unless otherwise specifically indicated.

Example 1—Preparation of Liquid Animal Digests (LADs)

Multiple liquid animal digests were prepared by sequentially following two processes, namely 1) a digestion process, followed by 2) a thermal reaction process. In each liquid animal digest prepared (LAD 1 and LAD 2), the digestion process was carried out by grinding and blending frozen animal tissue (or meat). More specifically, LAD 1 was prepared from blended organ tissues including 25 wt % pork liver, 25 wt % chicken liver, 25 wt % chicken heart and liver, and 25 wt % chicken pluck (combination of heart, liver, and lung). More specifically, LAD 2 was prepared from blended organ tissues including 50 wt % pork liver and 50 wt % chicken liver. In each case, steam was added to obtain a pumpable mixture that was then transferred to a reactor for digestion. As an example reference, pork liver can have an initial animal fat content of about 3 wt % to about 3.5 wt %, chicken liver can have an initial animal fat content of about 3.5 wt % to about 4.5 wt %, and chicken pluck can have an initial animal fat content of about 5.5 wt % to about 7 wt %, though animal fat content outside of these ranges can be found as well.

Digestion was carried out using technical enzymes mostly relying on proteases, e.g., subtilisin (Alcalase) protease from Novozyme (Denmark), at a pH from about 7.3 to about 7.7 (adjusting with sodium hydroxide) and at a temperature from about 54 °C to about 67 °C. (supplied by added steam) compatible with the functionality of the enzyme.

After digestion, sugars and precursors were added suitable for carrying out a Maillard reaction, and then the thermal reaction process was initiated to bring the mixture to a temperature ranging from about 90 °C to about 100 °C. (at atmospheric pressure) for about 30-45 minutes. The liquid animal digest prepared from this process was then filtered to remove any non-digested material, and then was transferred into a surge tank that was maintained above about 80 °C or even 90 °C in some examples. No cooling or pH adjustment occurred prior to feeding the liquid animal digest into a dryer. In this specific example, there was not a concentration step prior to drying.

Example 2—Preparation of Dried Animal Digest Particles Using Belt Spray Dryer (DAD 1 and DAD 2)

The liquid animal digests (LADs 1 and 2) prepared in accordance with Example 1 were dried using a FILTERMAT® spray dryer from GEA (Denmark) to generate dried animal digest particles (DAD 1 and 2, respectively). DAD 1 was dried using the following settings and conditions: primary burner 222-225 °C, secondary burner 85-95 °C, chamber (outlet) temperature 70-71 °C, and atomization pressure 65 to 105 bars (typical 85-100 bars). DAD 2 was dried using the following settings and conditions: primary burner 218-220 °C, secondary burner 122-126 °C, chamber (outlet) temperature 71-72 °C, and atomization pressure 80-85 bars. DAD 1 and DAD 2 resulted in dried particles having moisture contents, animal protein contents, animal fat contents, and particle size distributions as described in Example 4.

Example 3—Dried Animal Digest Particles Prepared from Fluidized Spray Dryer (Comparative DAD)

For comparison purposes, a commercially available dried animal digest (D'TECH8P 9130 available from SPF (part of Symrise Pet Food) was obtained, which is referred to herein as Comparative DAD. The Comparative DAD was prepared from 100 wt % pork liver. However, unlike the drying process of Example 2, the liquid animal digest used to prepare the Comparative DAD was dried using a fluidized spray dryer (instead of a belt spray dryer). The moisture content, animal protein content, animal fat content, and particle size distribution of Comparative DAD is provided in Example 4.

Example 4—Particle Size Distribution Values

Tables 1-3 below show the moisture content, animal protein content, and animal fat content for DAD 1, DAD 2, and Comparative DAD, respectively.

TABLE 1

| DAD 1 | | | |
|---|---|---|---|
| | Moisture ($H_2O$) (approx. wt %) | Animal Protein (approx. wt %) | Animal Fat (approx. wt %) |
| Average | 2.6 | 60.9 | ~21.5 |
| Maximum | 3.7 | 64.3 | 32* |
| Minimum | 2 | 53.4 | 18 |

*FILTERMAT ® spray dryer line was not reliably operable within this Animal Fat range, though enough product was produced to evaluate particle size distribution

TABLE 2

| DAD 2 | | | |
|---|---|---|---|
| | Moisture ($H_2O$) (approx. wt %) | Animal Protein (approx. wt %) | Animal Fat (approx. wt %) |
| Average | 2.1 | 64.8 | 14.7 |
| Maximum | 2.3 | 67 | 15.5 |
| Minimum | 1.9 | 62.7 | 13.9 |

TABLE 3

| Comparative DAD | | | |
|---|---|---|---|
| | Moisture ($H_2O$) (approx. wt %) | Animal Protein (approx. wt %) | Animal Fat (approx. wt %) |
| Reported SPF Values | 5 +/− 2 | 57 +/− 3 | 7 +/− 2 |
| Measured Values | 4.3 | 53.1 | 10.5 |

As can be seen from this data, DAD 2 was the only sample prepared using a belt spray dryer that did not cause appreciable clogging of the pneumatic outlet during manufacture.

Figure 2:
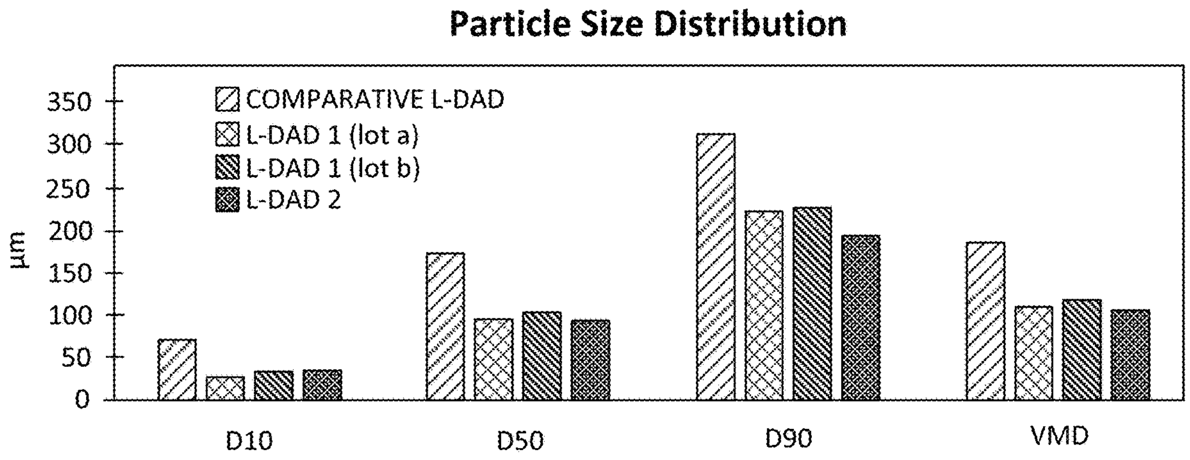
FIG. 2 is graph diagram illustrating example particle size distribution values for multiple samples of dried animal digest particles in accordance with the present disclosure.
Figure 3:
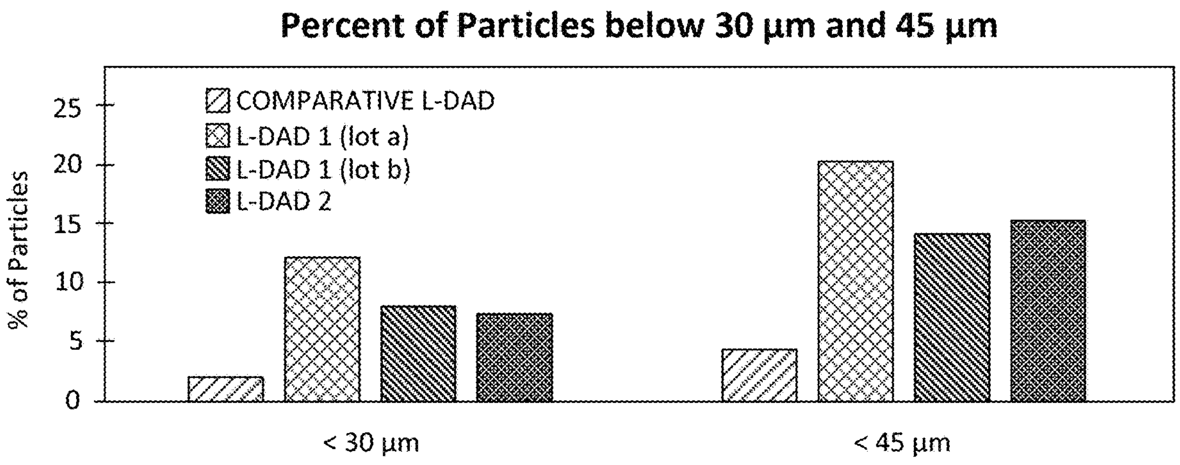
FIG. 3 is graph diagram illustrating additional example particle size distribution values for multiple samples of dried animal digest particles, specifically with respect to the presence of small particles, in accordance with the present disclosure.

Particle size distribution data for DAD 1, DAD 2, and Comparative DAD are provided in FIG. 2 and FIG. 3. Notably, DAD 1 in particular was analyzed by two separate labs utilizing two different processes to validate the relative consistency in particle size distribution using a belt spray dryer. As can be seen in FIGS. 2 and 3, the particle size distribution of the Comparative DAD included much larger D10, D50, and D90 particles than that prepared using the belt spray dryer.

Notably, DAD 2 was within the animal fat content range of about 16 wt % or less and was also within the particle size distribution range provided in accordance with the present disclosure.

Example 5—DAD Particle Morphology Comparison

Particle morphology can also play a role in the flowability of the dried animal digest particles. Particle morphology can be significantly different when drying with a belt spray dryer verses a fluidized spray dryer. Furthermore, the addition of silicon dioxide using a belt spray dryer can impact the smoothness of the dried animal digest particles formed therefrom.

Figure 4:
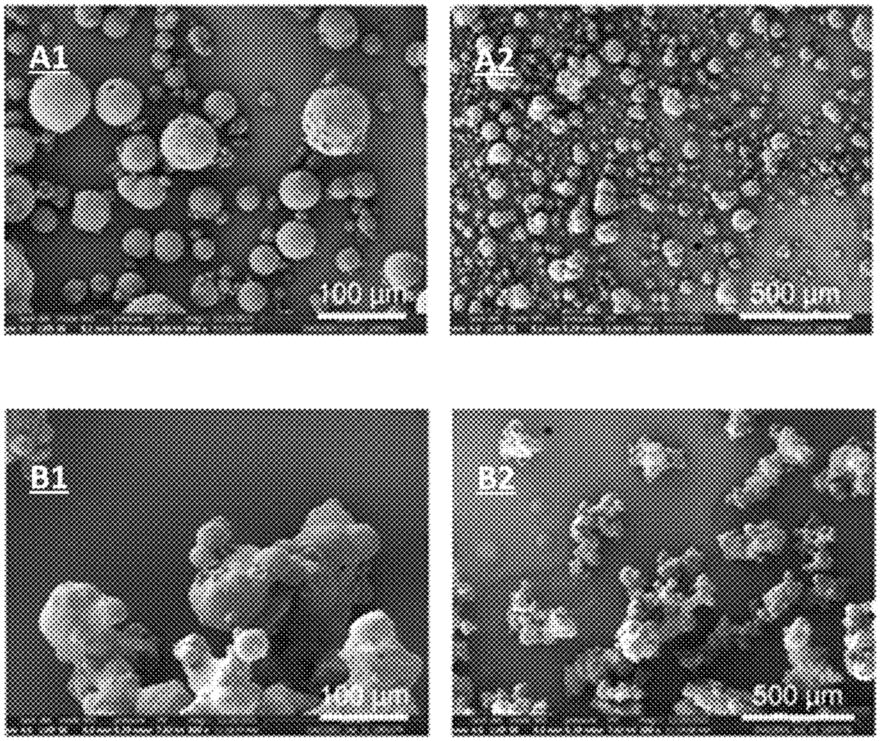
FIG. 4 and FIG. 5 include scanning electron microscope images illustrating example particle size distribution values and particle morphologies in accordance with the present disclosure.

To compare particle morphologies of a belt spray dryer compared to a fluidized spray dryer, the DAD 2 particles and Comparative DAD particles were viewed using a scanning electron microscope (SEM), with example images shown at FIG. 4. Images collected at two different magnifications for each of the samples are shown. Images A1 and A2 depict the DAD 2 samples prepared in accordance with the present disclosure. Notably, the particles are nearly spherical on average and are not agglomerated. On the other hand, images B1 and B2, which are images of the Comparative DAD samples prepared using a fluidized spray dryer, show much more irregular shaped particles that would more readily lead to agglomeration of particles. As can be seen in images A1 and A2, there appears to be less than about 2.5% of the particles that are agglomerated. Relating to flowability, irregular particle shapes are not as significant of a negative factor as the particle size distribution and the animal fat content, but in combination with these factors, the particle morphology can also contribute to reduced flowability.

Figure 5:
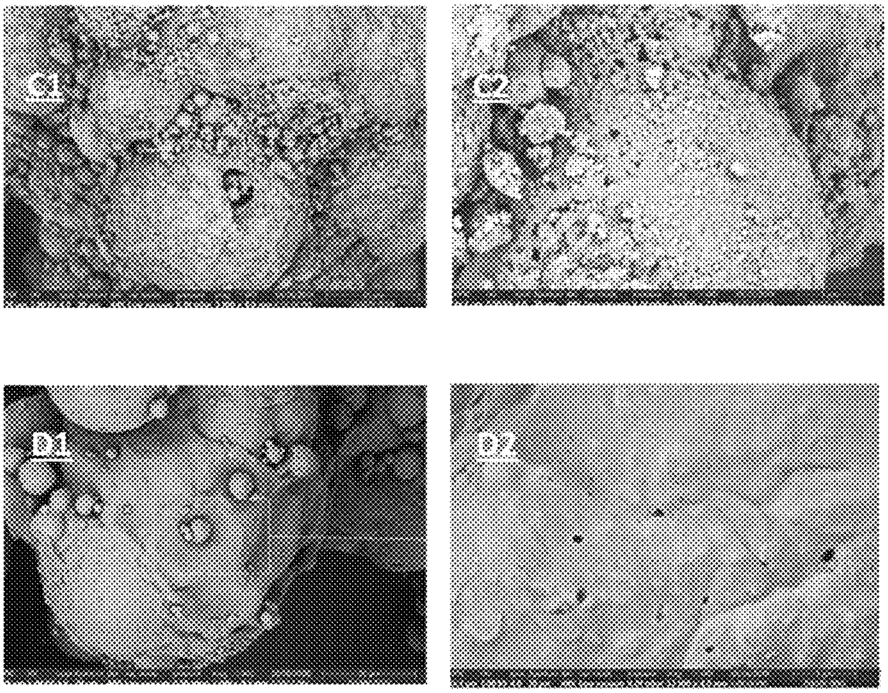

FIG. 5 illustrates dried animal digest particles prepared with and without silicon dioxide flow aid. Thus, this FIG. demonstrates that even though the addition of silicon dioxide as a flow aid is typically known to assist with the flow of particles, in the present case, the presence of silicon dioxide may contribute to some improved flow properties. For example, dried animal digest with higher fat content, and hence free fat on the surface in the presence of $SIO_2$, may allow particles of $SiO_2$ to slide against each other to facilitate some enhanced flow. However, with a goal of removing unwanted silicon dioxide as a flow aid, reduction in fat can also provide acceptable flow. More specifically, as shown in these examples, lower animal fat content was an adequate solution for enhancing flowability without the need for silicon dioxide, which was surprising. Images C1 and C2 show samples with silicon dioxide included, and images D1 and D2 show samples without silicon dioxide present. The surface of the samples without silicon dioxide in this example are considerably smoother.

Example 6—Preparation of Pet Food Compositions Including Kibble and DAD 2

A pet food composition was prepared that included about 90-94 wt % kibble coated with about 5-7.5 wt % fat coating and further dusted with 0.6-2 wt % of DAD 2 and about 0.4-0.5 wt % tetrasodium pyrophosphate (TSPP). In this instance, the fat coating can be provided by an animal fat, such as poultry fat, lard (pork fat), tallow (beef fat), or the like. A blend of the DAD 2 and TSPP was prepared to be dusted over the animal fat-coated kibble. The weight percentages in this example are based on the total weight of the pet food composition. In this example, the dried animal digest composition formulated to dust on the surface of the animal fat-coated kibble included both the DAD and the TSPP, but it is noted that the dried animal digest composition could have been solely provided by the DAD collected from the belt spray dryer, or alternatively/additionally could have been combined ingredients such as nutritional and/or palatability-enhancing additives, e.g., amino acids, vitamins, e.g., B1 (thiamin), probiotics, egg yolk, yeast, etc.

In the specification, there have been disclosed certain examples in accordance with the present disclosure. Although specific terms are employed, they are used in a generic and descriptive sense only and not for purposes of limitation. The scope of the invention is set forth in the claims. Obviously, many modifications and variations of the invention are possible in light of the above teachings. It is therefore to be understood that within the scope of the appended claims, the invention may be practiced otherwise than as specifically described

What is claimed is:

1. A dried animal digest composition, comprising dried animal digest particles having an animal fat content of from about 10 wt % to about 16 wt % and a moisture content of about 3 wt % or less, wherein the dried animal digest particles have a volume diameter particle size distribution where D10 is from about 20 μm to about 50 μm, D50 is from about 60 μm to about 150 μm, and D90 is from about 160 μm to about 275 μm, wherein the percentage of dried animal digest particles below 30 μm based on volume diameter is from 3% to 20%, wherein the percentage of dried animal digest particles below 45 μm based on volume diameter is from 5% to 25%, and wherein the dried animal digest composition is substantially devoid of silicon dioxide flow aid.

2. The dried animal digest composition of claim 1, wherein a volume mean diameter of the dried animal digest particles is from about 60 μm to about 160 μm.

3. The dried animal digest composition of claim 1, wherein D10 is from about 25 μm to about 40 μm, D50 is from about 75 μm to about 125 μm, D90 is from about 185 μm to about 250 μm, or a combination thereof.

4. The dried animal digest composition of claim 1, wherein the dried animal digest composition is completely devoid of the silicon dioxide flow aid, and is also devoid of chemical flow aids selected from the group consisting of clay, flour, fly ash, quicklime, starch, zeolite, silicates, stearates, phosphates, polysaccharides, salts of fatty acids, diatomaceous earth, bamboo shoot, corn cob, pea fiber, pea hull, citrus fiber, cellulose powder, microcrystalline cellulose, or a combination thereof.

5. The dried animal digest composition of claim 1, wherein the dried animal digest particles are from about 40 wt % to about 80 wt % protein and from about 10 wt % to about 16 wt % animal fat.

6. The dried animal digest composition of claim 1, wherein from about 80 wt % to 100 wt % of animal tissue used to prepare the dried animal digest particles is from liver tissue.

7. The dried animal digest composition of claim 1, wherein animal tissue used to prepare the dried animal digest particles is pre-processed to remove animal fat.

8. The dried animal digest composition of claim 1, wherein 100 wt % of the dried animal digest composition is from the dried animal digest particles.

9. The dried animal digest composition of claim 1, wherein from about 25 wt % to about 99.99 wt % of the dried animal digest composition is from the dried animal digest particles, and from about 0.01 wt % to about 75 wt % of the animal digest composition comprises one or more additive selected from the group consisting of a phosphate compound, a pyrophosphate compound, tetrasodium pyrophosphate (TSPP), a choline compound, an amino acid, a vitamin, a probiotic, egg yolk, and yeast.

10. The dried animal digest composition of claim 1, wherein the dried animal digest particles include yeast.

* * * * *